(12) United States Patent
Chen

(10) Patent No.: US 7,467,290 B2
(45) Date of Patent: Dec. 16, 2008

(54) METHOD AND SYSTEM FOR PROVIDING A MODULAR SERVER ON USB FLASH STORAGE

(75) Inventor: Ben Wei Chen, Fremont, CA (US)

(73) Assignee: Kingston Technology Corporation, Fountain Valley, CA (US)

( * ) Notice: Subject to any disclaimer, the term of this patent is extended or adjusted under 35 U.S.C. 154(b) by 0 days.

(21) Appl. No.: 10/875,048

(22) Filed: Jun. 22, 2004

(65) Prior Publication Data

US 2004/0236980 A1     Nov. 25, 2004

Related U.S. Application Data

(63) Continuation-in-part of application No. 10/002,652, filed on Oct. 19, 2001, now Pat. No. 7,103,765.

(51) Int. Cl.
*G06F 15/177* (2006.01)
(52) U.S. Cl. ............................... 713/1; 713/2; 713/100
(58) Field of Classification Search ..................... 713/1, 713/2, 100
See application file for complete search history.

(56) References Cited

U.S. PATENT DOCUMENTS

| | | | | |
|---|---|---|---|---|
| 5,561,770 A * | 10/1996 | de Bruijn et al. | ............ | 709/225 |
| 5,745,102 A * | 4/1998 | Bloch et al. | .................. | 345/530 |
| 5,923,599 A * | 7/1999 | Hii et al. | ..................... | 365/201 |
| 6,148,354 A * | 11/2000 | Ban et al. | .................... | 710/301 |
| 6,757,730 B1 * | 6/2004 | Lee et al. | ..................... | 709/226 |
| 6,851,614 B2 * | 2/2005 | Garnett | ........................ | 235/487 |
| 2003/0108018 A1 * | 6/2003 | Dujardin et al. | ............. | 370/338 |
| 2003/0200379 A1 * | 10/2003 | Hollinsworth et al. | ...... | 711/103 |
| 2003/0225971 A1 * | 12/2003 | Oishi et al. | ................. | 711/115 |

* cited by examiner

*Primary Examiner*—Tse Chen
(74) *Attorney, Agent, or Firm*—Sawyer Law Group LLP

(57) ABSTRACT

A method and system for providing a modular server-on-a-USB-flash-storage is disclosed. The server-on-a-USB-flash-storage is installed on a computing device. The method and system include providing USB interface logic, USB Local Control Program, a flash memory and a set of control button connectors, light emitting diodes (LED) connectors and a liquid crystal display (LCD) connector. The USB Local Control Program is coupled with the USB interface logic and the flash memory. The USB interface logic interacts with the computing device and allows the computing device to detect the server board. The USB Local Control Program boots up the server and prepares the computing device for use as the server. The flash memory stores a server image for the server, which is provided to the computing device using the USB Local Control Program. The control button connectors allow the server to be turned on, shut down gracefully, or restored to its initial state, by a single press of buttons connected to these connectors. The LED and LCD connectors allow the system status to be displayed or shown. Different server images can be installed onto the same computing device, be it a workstation, a PDA or a notebook computer, by simply swapping in and out the USB flash storage while the computing device is still running or "hot."

28 Claims, 15 Drawing Sheets

METHOD AND SYSTEM FOR PROVIDING A MODULAR SERVER ON USB FLASH STORAGE

CROSS REFERENCES TO RELATED PATENT APPLICATIONS

This application is a continuation-in-part of Ser. No. 10/002,652, now issued U.S. Pat. No. 7,103,765 filed Oct. 19, 2001.

BACKGROUND OF THE INVENTION

1. Field of the Invention

The present invention relates to computer systems, and more particularly to a method and system for providing a server on a generalized computing device.

2. Background Art

FIG. 1 depicts a generalized computing device 10. The computing device 10 includes at least a CPU 12 and an optional mass storage 18, such as a hard disk. The computing device 10 may also include other features. The computing device depicted in FIG. 1 also includes a memory 14 such as a flash memory, an operating system (OS) 15, a display 16, an input/output device 20 such as a keyboard, BIOS 22, a network interface 24 and a bus interface 26. An optional operating system (OS) 19 may reside on the mass storage 18. Communication to a network (not shown) is carried out through the network interface 24. Similarly, communication to any attached devices (not shown) can be carried out via the bus interface 26. For example, the bus interface 26 could include interfaces for PCI Express, SATA, Ethernet, Infiniband or other serial bus connectors.

The computing device 10 is capable of performing a variety of functions. It is often desirable to utilize the computing device 10 as a server. A server would include additional hardware and/or software that allows the server to serve multiple users. Thus, the server would allow multiple users to share resources, such as printers or the optional mass storage 18 of the computing device 10.

There are a number of conventional methods for allowing the computing device 10 to be used as a server. In general, these conventional methods involve obtaining server software and installing the software on the computing device 10. The user must then manually set up the desired functions for the server. Alternatively, the computing device 10 could be specially built to function as a server. In either case, ensuring that the computing device 10 can function as a server is expensive. For example, obtaining and installing server software on the computing device 10 or specially building the computing device 10 may cost between $500 and $5,000. Moreover, installing the software and tailoring the system to provide the desired individual functions requires a substantial investment of time on the part of the user.

OBJECT OF THE INVENTION

As Universal Serial Bus (USB) becomes a standard communication interface on the PC and digital imaging device, USB-based flash storage systems are starting to proliferate the consumer market. A traditional USB-based flash storage system tends to include a USB Local Control Program and one or more flash memory chips in addition to the USB connector. USB flash storage is becoming one of the most popular choices for external removable storage due to its simplicity, high performance and reliability.

If the PC or computing device has the capability in its BIOS to boot from a USB flash storage, it creates the possibility of incorporating server functionality into a USB flash storage. The server is thus modular and very portable. The actual storage drives on a server are no longer needed to reside on the same physical space with the server itself. It is possible to decouple the server from the storage drives completely. The server or storage drives can each evolve or upgrade independently of each other. Being able to easily hot swap the USB flash storage from the PC or computing device achieves improvements in service and support to the server itself.

Conventionally, once a server is installed, the operating environment cannot change until the server is properly unmounted, shut down and physically changed. But, owing to the hot-swappable nature of the USB flash storage, it creates a unique application that the server environment becomes portable. Different server images can be installed onto the same computing device, be it a workstation, a PDA or a notebook computer, by simply swapping in and out the USB flash storage while the computing device is still running or "hot". Completely different server operating environments can be created in a matter of seconds instead of hours or days.

Accordingly, what is needed is a system and method for cheaply and easily allowing the computing device to be used as a server. The present invention addresses such a need.

SUMMARY OF THE INVENTION

The present invention provides a method and system for providing a server on a computing device. The computing device includes at least a processor and an optional mass storage device. The method and system comprise providing bus interface logic, providing USB Local Control Program, a flash memory and, preferably, a set of control button connectors, light emitting diode (LED) connectors and a liquid crystal display (LCD) connector. The USB Local Control Program is coupled with the bus interface logic and the memory. The bus interface logic interacts with the computing device and allows the computing device to detect the system. The USB Local Control Program boots up the server and prepares the computing device for use as the server. The memory stores a server image for the server, which is provided to the computing device using the USB Local Control Program. The control button connectors allow the server to be turned on, shut down gracefully, or restored to its initial state, by a single press of buttons connected to these connectors. The LED and LCD connectors allow the system status to be displayed or shown. Different server images can be installed onto the same computing device, be it a workstation, a PDA or a notebook computer, by simply swapping in and out the USB flash storage while the computing device is still running or "hot". Completely different server operating environments can be created as a matter of seconds instead of hours or days.

By virtue of the system and method disclosed herein, an inexpensive, easy to use mechanism is provided for allowing the computing device to be used as a server.

DETAILED DESCRIPTION

The present invention relates to an improvement in computer systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for providing a modular server on a USB flash storage. The server-on-a-USB is installed on a computing device. The method and system include providing bus interface logic, providing a USB Local Control Program, flash memory and, preferably, a set of control button connectors, light emitting diodes (LED) connectors and a liquid crystal display (LCD) connector. The USB Local Control Program is coupled with the bus interface logic and the flash memory. The bus interface logic interacts with the computing device and allows the computing device to detect the USB server flash storage. The USB Local Control Program boots up the server and prepares the computing device for use as the server. The flash memory stores a server image for the server, which is provided to the computing device using the USB Local Control Program. The control button connectors allow the server to be turned on, shut down gracefully, or restored to its initial state, by a single press of buttons connected to these connectors. The LED and LCD connectors allow the system status to be displayed or shown.

The present invention will be described in terms of a particular computing device and a system having certain components. However, one of ordinary skill in the art will readily recognize that this method and system will operate effectively for other computing devices and other systems having other components performing substantially the same functions.

Figure 1:
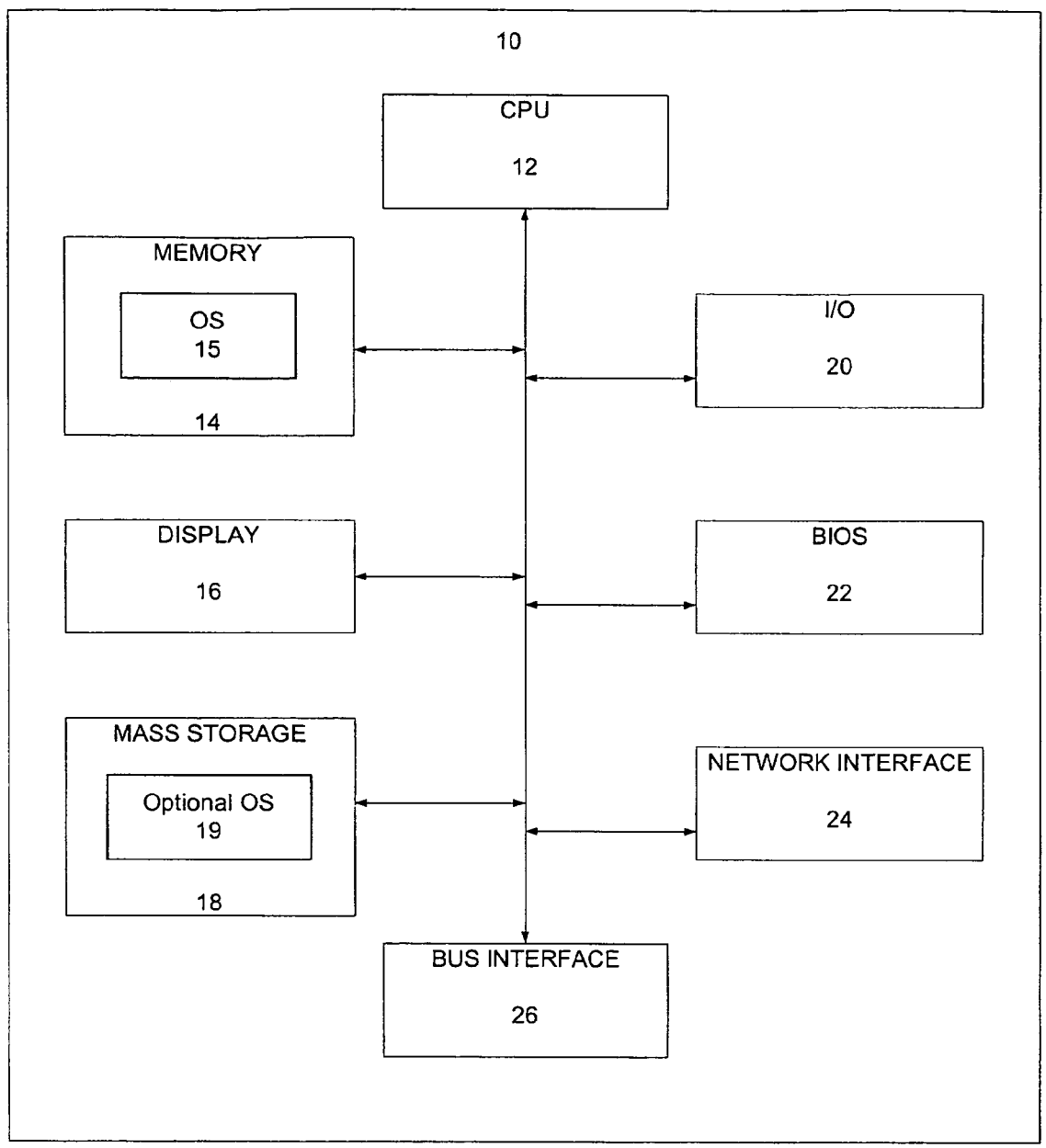
FIG. 1 is a block diagram of a conventional computing device.
Figure 2:
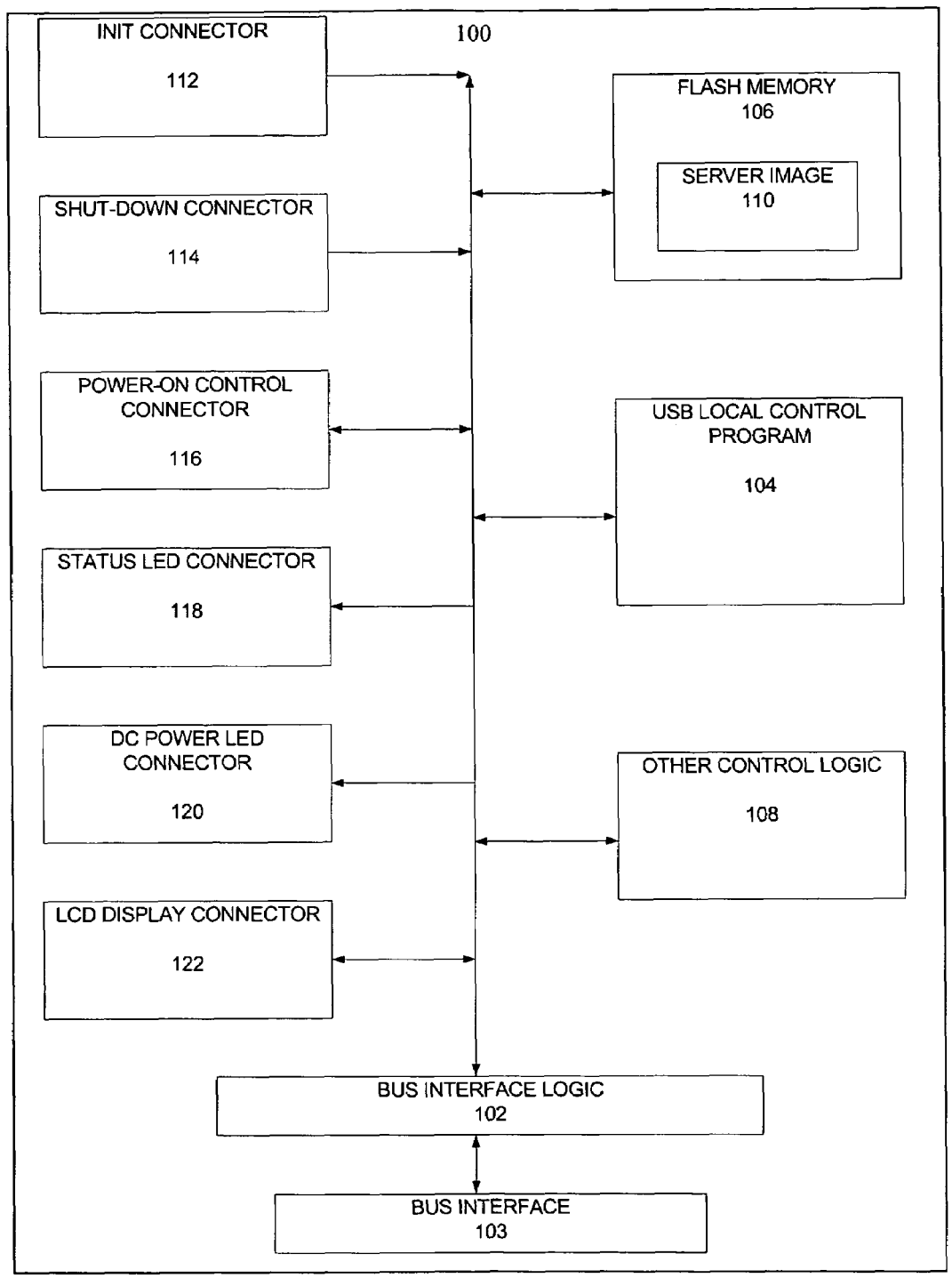
FIG. 2 is a high level block diagram of a USB flash storage in accordance with the present invention for allowing the computing device to be used as a server.

To more particularly illustrate the method and system in accordance with the present invention, FIG. 2 depicts a high-level block diagram of a USB flash storage 100 for allowing the computing device to be used as a server. The USB flash storage 100 is to be used in conjunction with a computing device such as the computing device 10 of FIG. 1. The USB flash storage 100 includes bus interface logic 102, USB Local Control Program 104, memory 106 and, in a preferred embodiment, other control logic 108 and connectors. The components 102, 104, 106 and 108 of the USB flash storage 100 are preferably integrated into a single board that can be plugged into the computing device 10.

The USB flash storage 100 is also preferably used in conjunction with a system having a generic user interface, such as a Windows or Linux operating system. The USB flash storage 100 attaches to the computing device 10 via the bus interface logic 102 and bus interface 103 of the USB flash storage 100 and the bus interface 26 of the computing device 10 of FIG. 1. In operation, the computing device 10 detects the USB flash storage 100 through the bus interface logic 102 using the bus protocols of the computing device 10. The USB Local Control Program 104 boots up the server and prepares the computing device for use as the server.

The memory 106 includes a server image 110 for the server being provided by the USB flash storage 100. Preferably, the server image 110 is compressed and stored on the memory 106. The server image 110 is preferably loaded onto the computing device 10 and boots up, as discussed below. Once booted up, the server image 110 allows the computing device 10 to function as a server. The USB flash storage 100 also includes the other control logic 108 and connectors. In a preferred embodiment, the other control logic 108 is managed by the USB Local Control Program 104. The connectors preferably include an Init connector 112, a shut-down connector 114, a power-on control connector 116, a status LED connector 118, a DC power LED connector 120 and a LCD display connector 122. However, in another embodiment, the other control logic 108 could include other components. The connectors 112, 114, 116, 118, 120 and 122 can be coupled to LEDs (not shown) and an LCD display (not shown) for the board. The connectors are controlled using the other control logic 108.

Figure 3:
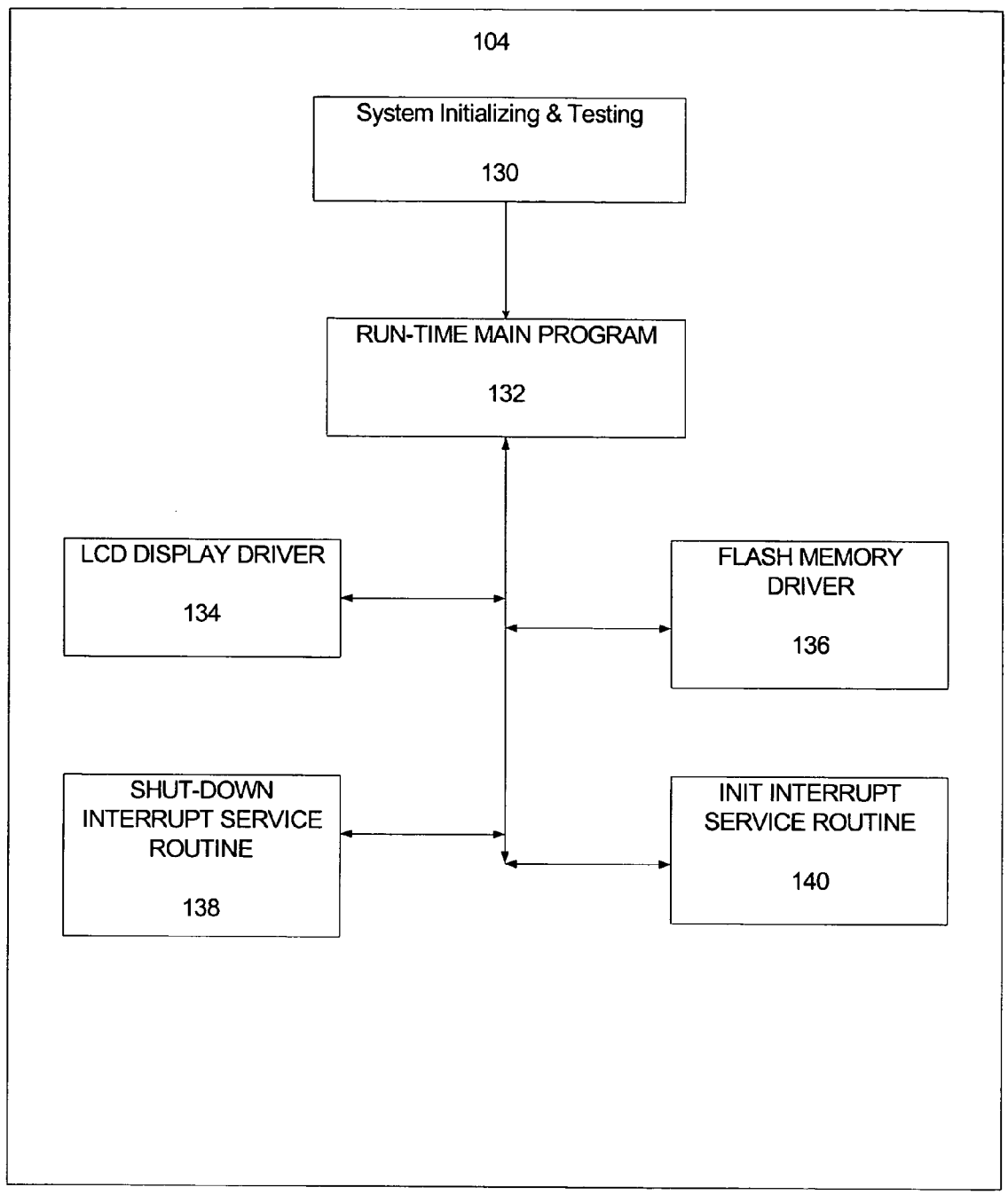
FIG. 3 is a block diagram of one embodiment of the Local Control Program of the USB flash storage in accordance with the present invention for allowing the computing device to be used as a server.

FIG. 3 depicts one embodiment of the Local Control Program 104 of FIG. 2. The Local Control Program 104 includes a system initialization and testing block 130, a local Control Program run-time main program 132, an LCD display driver 134, a flash memory driver 136, a shut-down interrupt service routine 138, and an Init interrupt service routine 140. The drivers 134 and 136 are used to drive the display 16 and the memory 106. The shut-down interrupt service routine 138 and Init interrupt service routine 140 are used in conjunction with the other control logic 108 described below.

Referring concurrently to FIGS. 1-3, in operation, once the computing device 10 detects the presence of the USB flash storage 100, the Local Control Program 104 is activated. The Local Control Program 104 preferably connects with the BIOS 22 and begins controlling the computing device 10. The Local Control Program 104 preferably performs tests on the USB flash storage 100 to ensure that the USB flash storage 100 can control the functions of the computing device 10 as desired. For example, the USB Local Control Program 104 ensures that the display, memory and other input/output devices can be controlled. For example, in a preferred embodiment, the hardware identification of the flash memory 106 is read to determine the size of the memory 106. The system initialization and testing block 130 preferably performs the testing functions. An Ethernet MAC address of the computing device 10 is also preferably read to ensure that security and personalization of the computing device 10 is preserved. In a preferred embodiment, an identification for the USB flash storage 100 is read by the USB Local Control Program 104 to determine the version of the USB flash storage 100. The USB Local Control Program 104 also preferably establishes a unique personalized key, discussed below. The USB Local Control Program 104 establishes a boot-up sequence on the computing device 10. The memory 106 is then mounted and boots up. The server image 110 is then extracted from the memory 106 using the unique personalized key. Without the key, the server image preferably cannot extract and utilize the server image 110.

Figure 4:
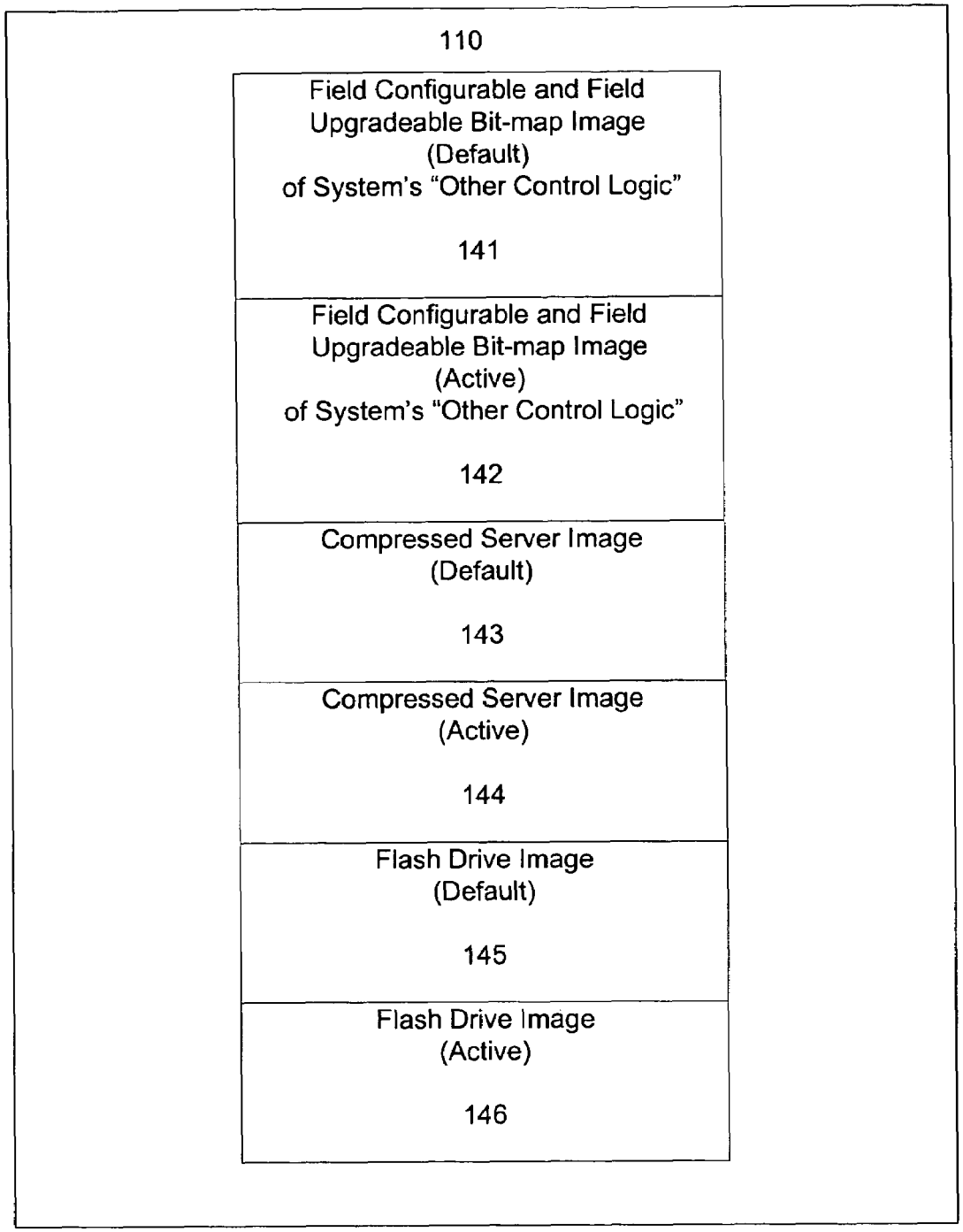
FIG. 4 is a diagram of one embodiment of the image of the server stored in the memory of the USB flash storage in accordance with the present invention for allowing the computing device to be used as a server.

FIG. 4 is a diagram of one embodiment of the images for the server stored in the memory 106. The server image 110 includes a default field configurable and field upgradeable bitmap image 141 of the other control logic 108 of FIG. 2, an active field configurable and field upgradeable bitmap image 142 of the other control logic 108, a default compressed server image 143, an active server image 144, a default flash drive boot-up image 145 and an active flash drive boot-up image 146. The bitmaps 141 and 142 indicate the default and actual (active) bitmap images for the control logic to allow the server to track and utilize the control logic 108.

The compressed server images 143 and 144 are the default and actual (active) server images for loading onto the computing device 10. The active server image 144 thus corresponds to the server image 110, depicted in FIG. 2, that is loaded onto the computing device. The flash drive images 145 and 146 are the default and actual (active) boot-up images of the flash memory 106.

Once the server image 110 is loaded onto the computing device 10, the computing device 10 can function as a server. Furthermore, the defaults can be restored, for example in an Init interrupt, described below in FIG. 10, using the defaults 141, 143 and 145. The shut-down interrupt service routine 138 and Init service routine 140 can optionally reside in the server image 110 as well.

Figure 5:
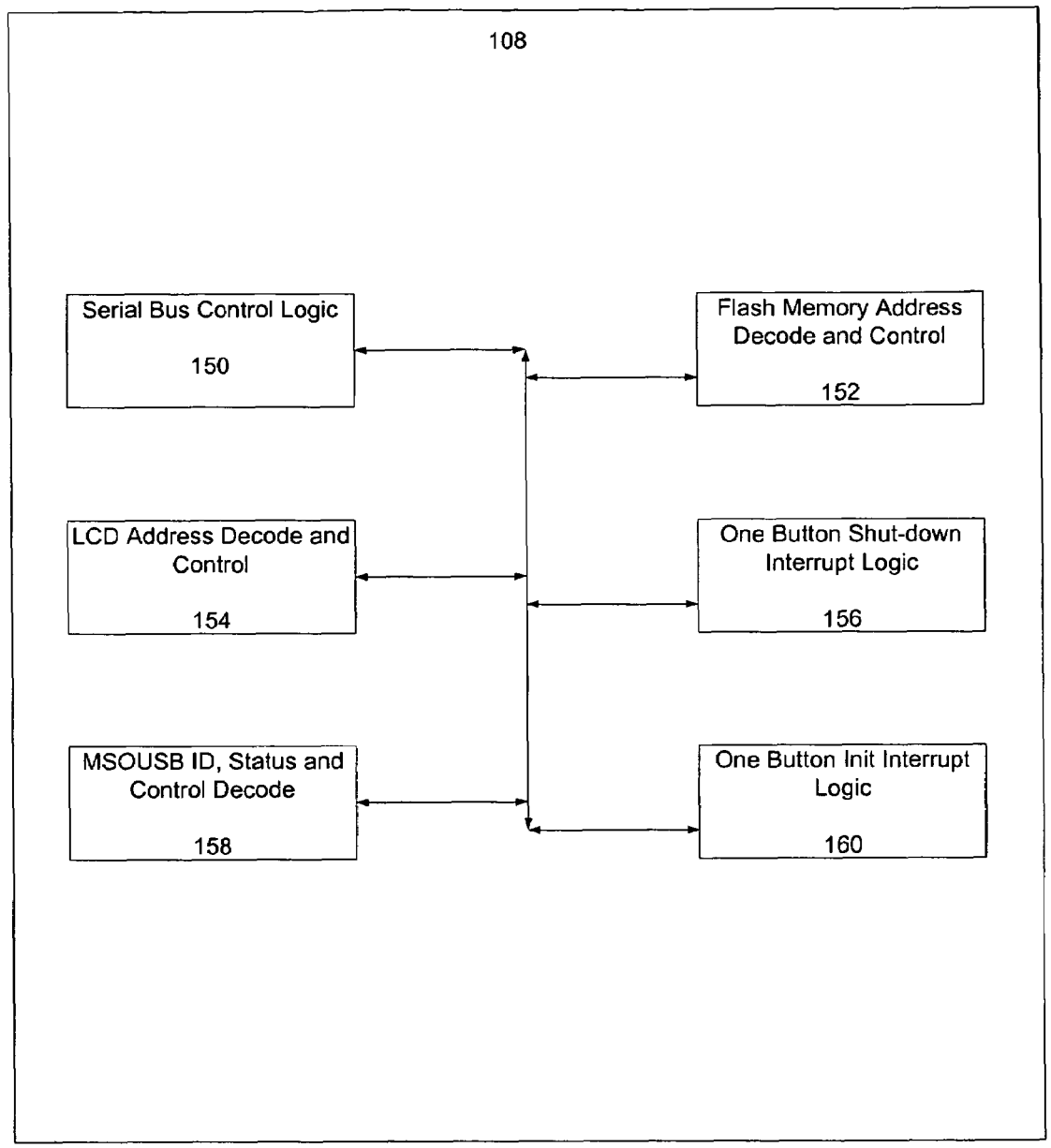
FIG. 5 is a more detailed block diagram of one embodiment of the other control logic in the USB flash storage in accordance with the present invention for allowing the computing device to be used as a server.

FIG. 5 is a more detailed block diagram of one embodiment of the other control logic 108 (of FIG. 2) in the USB flash storage 100 in accordance with the present invention for allowing the computing device to be used as a server. The other control logic 108 includes address decode and control 150 for the Local Control Program 104, a flash memory address decode and control 152, an LCD address decode and control 154, one button shut-down interrupt logic 156, ID, status and control decode 158 and one button Init interrupt logic 160. These blocks are used to provide the additional functions, described below, such as a one button shut down and Init interrupt.

Figure 6:
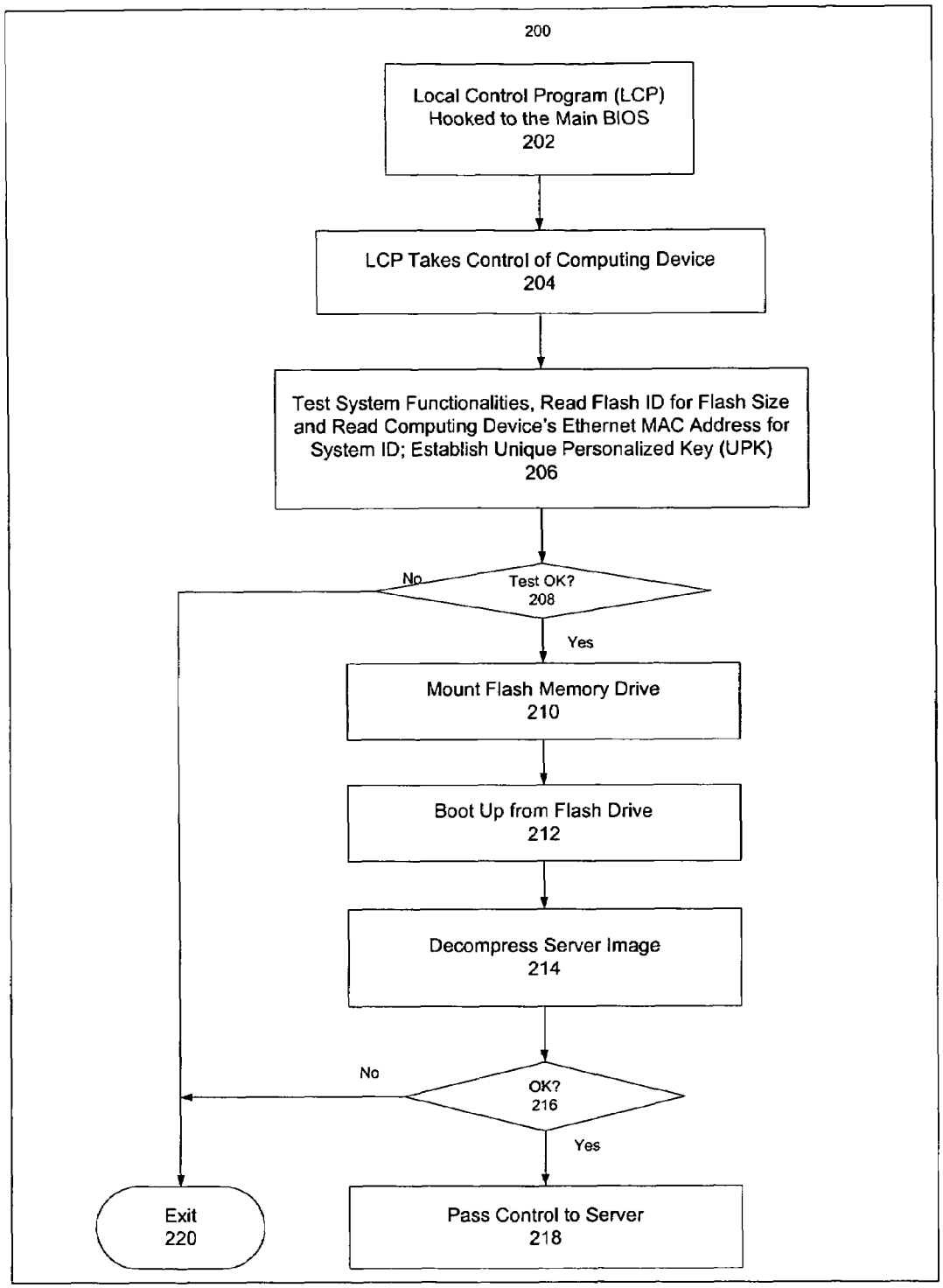
FIG. 6 is a flow chart of one embodiment of a method for booting up the USB flash storage in accordance with the present invention to allow the computing device to be used as a server.

FIG. 6 is a flow chart of one embodiment of a method 200 in accordance with the present invention for using the USB flash storage 100. The method 200 preferably commences after the computing device 10 has found the USB flash storage 100. The method 200 is described in the context of the components depicted in FIGS. 1-5. Referring to FIGS. 1-6, the USB Local Control Program 104 is automatically coupled with the BIOS 22 of the computing device 10, via step 202. The USB Local Control Program 104 takes control of the computing device 10, via step 204. The functions of the USB flash storage 100 are tested, via step 206.

It is determined whether the test(s) performed in step 206 indicate that the USB flash storage 100 is functioning properly, via step 208. If not, then the method 200 terminates, via step 220. If it is determined that the USB flash storage 100 runs properly, then the memory 106 is mounted on the computing device 10, via step 210. The boot up of the computing device 10 is then performed from the memory 106 that was just mounted, via step 212. The server image 110 is found, and decompressed if necessary, via step 214. It is determined whether the functions of the method 200 were properly performed, via step 216. If so, then control is passed to the server, via step 218. Otherwise, the method 200 ends at step 220.

Thus, the method 200 and USB flash storage 100 allow the computing device 10 to be used as a server. Because most of the method 200 is performed automatically, the user need not manually configure the computing device 10. Instead, the user merely plugs in the board on which the USB flash storage 100 is integrated. Thus, the process used to allow a computing device 10 to be used as a server is simplified. Moreover, the USB flash storage 100 is relatively inexpensive, often costing on the order of less than $25 in quantity. Thus, the computing device 10 can be turned into a server relatively cheaply and easily.

Figure 7:
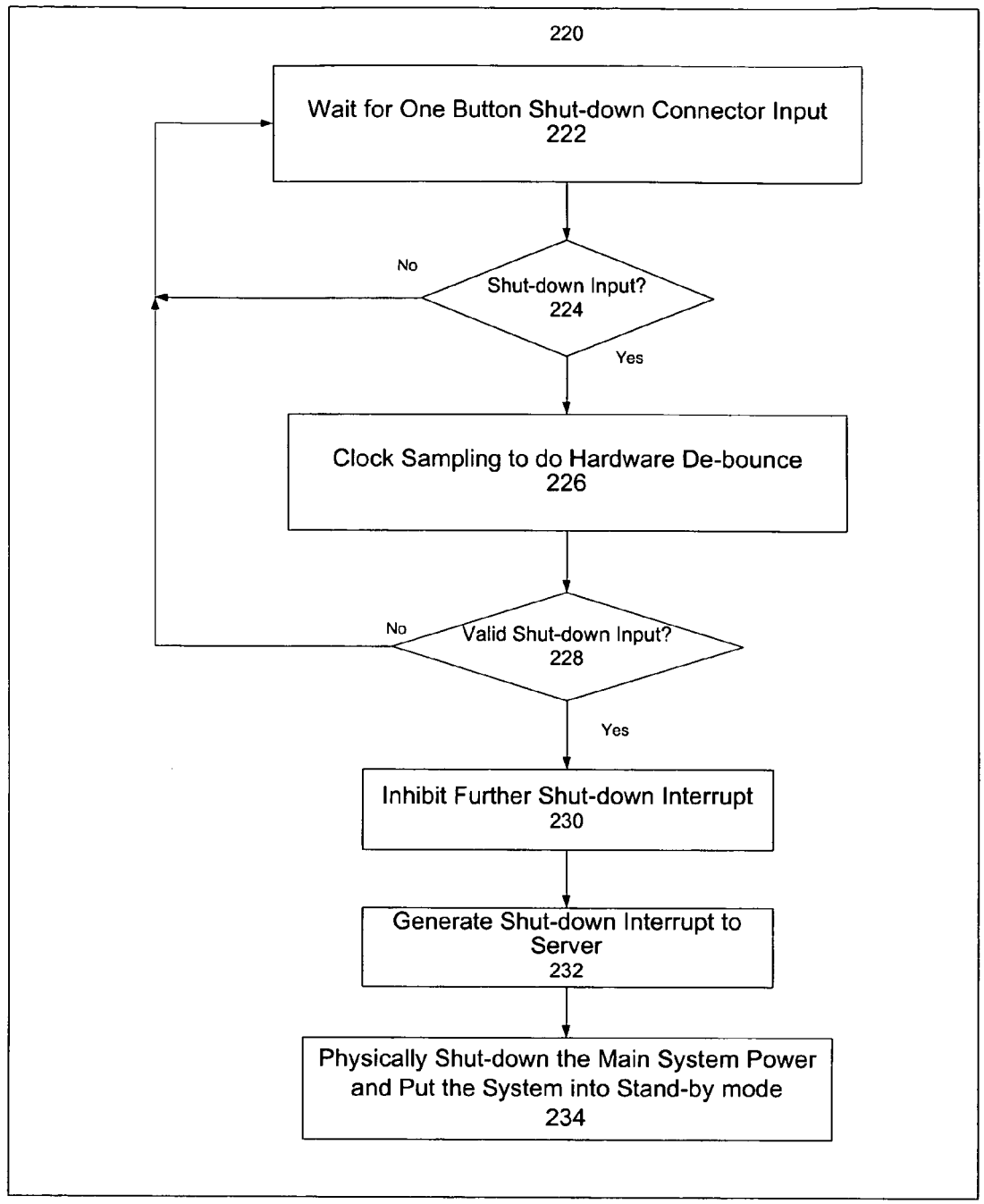
FIG. 7 is a flow chart of one embodiment of a method for using one-button shut down interrupt logic as a feature of the USB flash storage in accordance with the present invention for allowing the computing device to be used as a server.

The USB flash storage 100 also preferably uses the other controls 108 and connectors 109 to provide other functions in the server. FIG. 7 depicts one embodiment of a method 220 for utilizing one button shut-down interrupt logic 156 and the shut-down connector 114. The one button shut-down interrupt logic 156 waits for input, via step 222. In a preferred embodiment, the input includes a push button (not shown) being depressed for a particular time. It is determined whether shut-down input was received, via step 224. If not, then prior step 222 is repeated. Otherwise, clock sampling is performed to allow for hardware de-bounce, via step 226. It is determined whether the input was valid shut-down input, via step 228. In a preferred embodiment, valid shut-down input includes the push button being depressed for a particular time. If the input was not valid, then prior step 222 is repeated. Otherwise, further shut-down interrupts are inhibited, via step 230. Step 230 ensures that the method 220 can be completed for the valid shut down input already provided. A shut down interrupt to the server is then generated, via step 232. A method for generating such an interrupt is described below with respect to FIG. 8. The main system power is then shut down and the USB flash storage 100 is put into stand-by mode, via step 234. Thus, the USB flash storage 100 can be shut down using a single press of a button. A user can, therefore, shut down the server provided using the USB flash storage 100 relatively quickly and easily, through the use of a single button.

Figure 8:
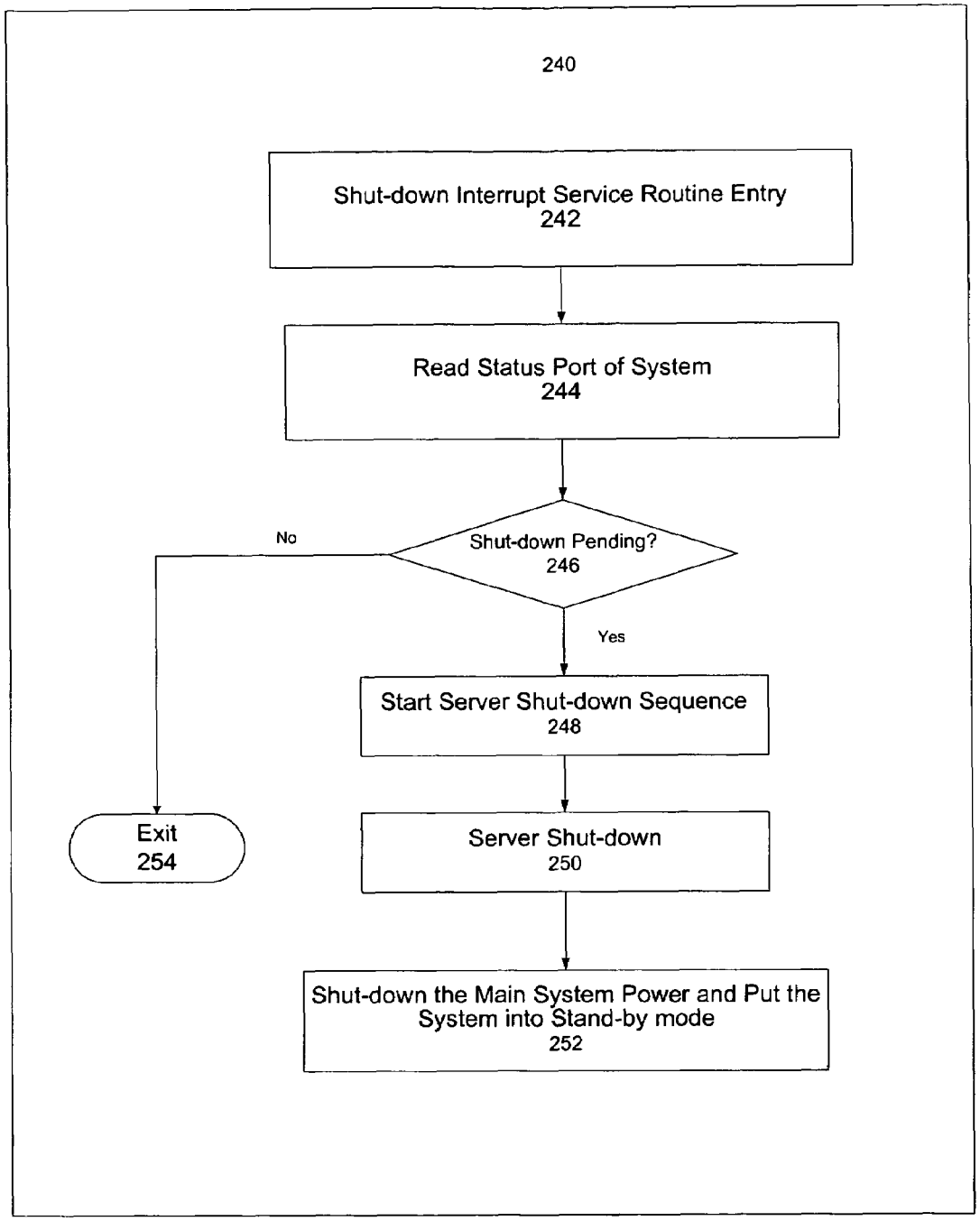
FIG. 8 is a flow chart of one embodiment of a method for a shut down interrupt routine in the USB flash storage in accordance with the present invention for allowing the computing device to be used as a server.

FIG. 8 is a flow chart of one embodiment of a method 240 for a shut down interrupt routine in the USB flash storage 100 in accordance with the present invention. The method 240 is preferably implemented in conjunction with the one button shut-down interrupt logic 156 of FIG. 5. A shut-down interrupt service routine entry is provided, via step 242. A status port of the USB flash storage 100 is read, via step 244. The status port of the USB flash storage 100 indicates whether a shut down is pending. It is determined whether a shut down is pending, via step 246. If not, then the method 240 is terminated, via step 254. Otherwise, a shut down sequence for the server is initiated, via step 248. The server is then shut down, via step 250. The main power to the USB flash storage 100 is then shut down and the USB flash storage 100 is put into standby mode, via step 252. Thus, the USB flash storage 100 can be shut down relatively simply and easily.

Figure 9:
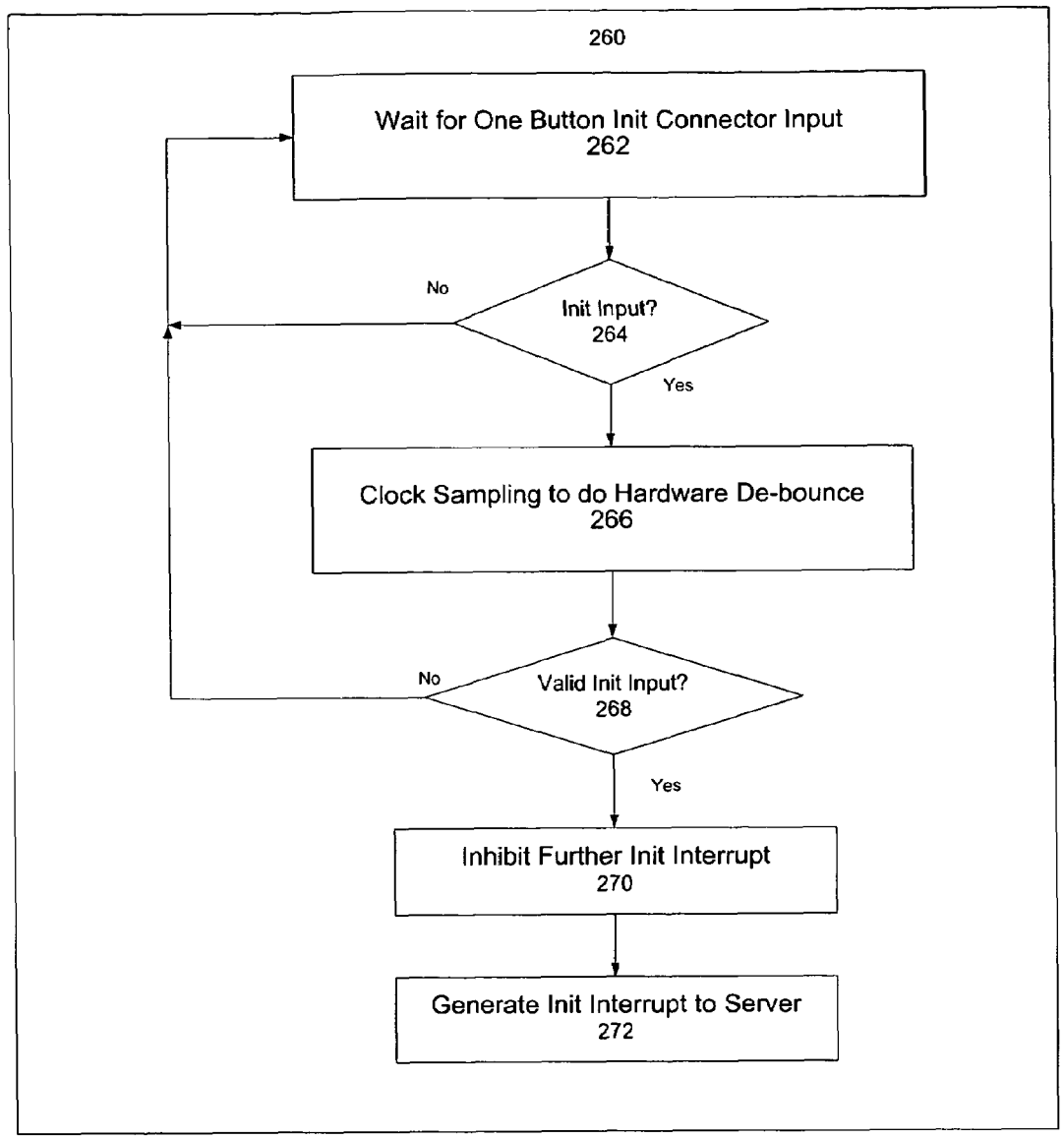
FIG. 9 is a flow chart of one embodiment of a method for using one-button Init interrupt logic as a feature of the USB flash storage in accordance with the present invention for allowing the computing device to be used as a server.

FIG. 9 is a flow chart of one embodiment of a method 260 for using one-button Init interrupt logic as a feature of the USB flash storage 100 in accordance with the present invention. The method 260 is used in conjunction with the one button Init interrupt logic 160 and the Init connector 112. The one button Init interrupt logic 160 waits for connector input, via step 262. The connector input is preferably a push button (not shown) being depressed. It is determined whether Init input is received, via step 264. If not, step 262 is repeated. Otherwise, clock sampling is performed to allow for hardware de-bounce, via step 266. It is determined whether the Init input received is valid, via step 268. If not, step 262 is repeated. Otherwise, further Init interrupts are inhibited, via step 270. Step 270 ensures that the method 260 can be completed for valid Init input already received. An Init interrupt to the server is then generated, via step 272. The server is thus restored to its default state using the method 260. The return to the default state is preferably found in the default server image 143 residing on the memory 106.

Figure 10:
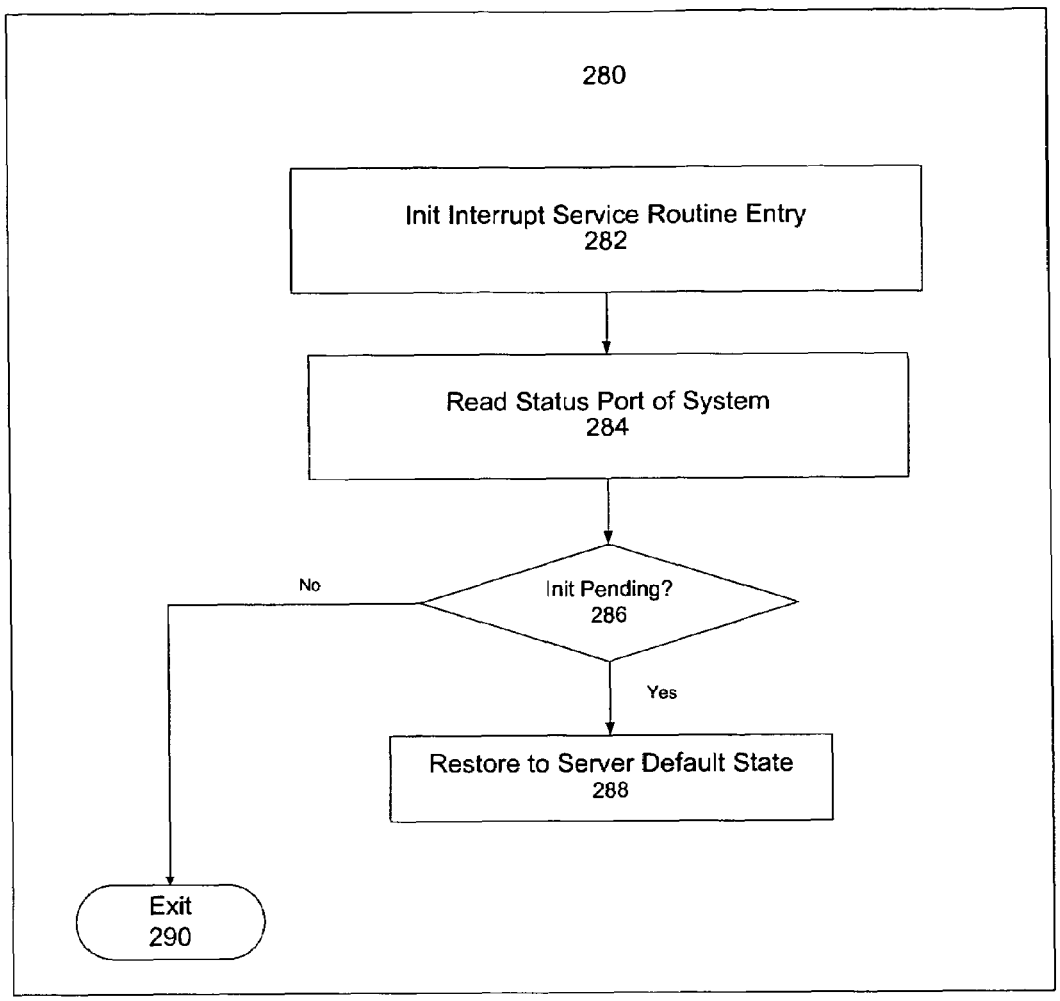
FIG. 10 is a flow chart of one embodiment of a method for an Init interrupt routine in the USB flash storage in accordance with the present invention for allowing the computing device to be used as a server.

FIG. 10 is a flow chart of one embodiment of a method 280 for an hit interrupt routine in the USB flash storage 100 in accordance with the present invention. The method 280 is preferably used for performing the step 272 of the method 260 of FIG. 9.

A Init interrupt service routine entry is provided, via step 282. A status port of the USB flash storage 100 is read, via step 284. The status port of the USB flash storage 100 indicates whether an initialization is pending. It is determined whether an initialization is pending, via step 286. If not, then the method 280 is terminated, via step 290. Otherwise, the server is restored to its default state, via step 288. Thus, the USB flash storage 100 can be initialized relatively simply and easily, by a push of a button by a user.

Figure 11:
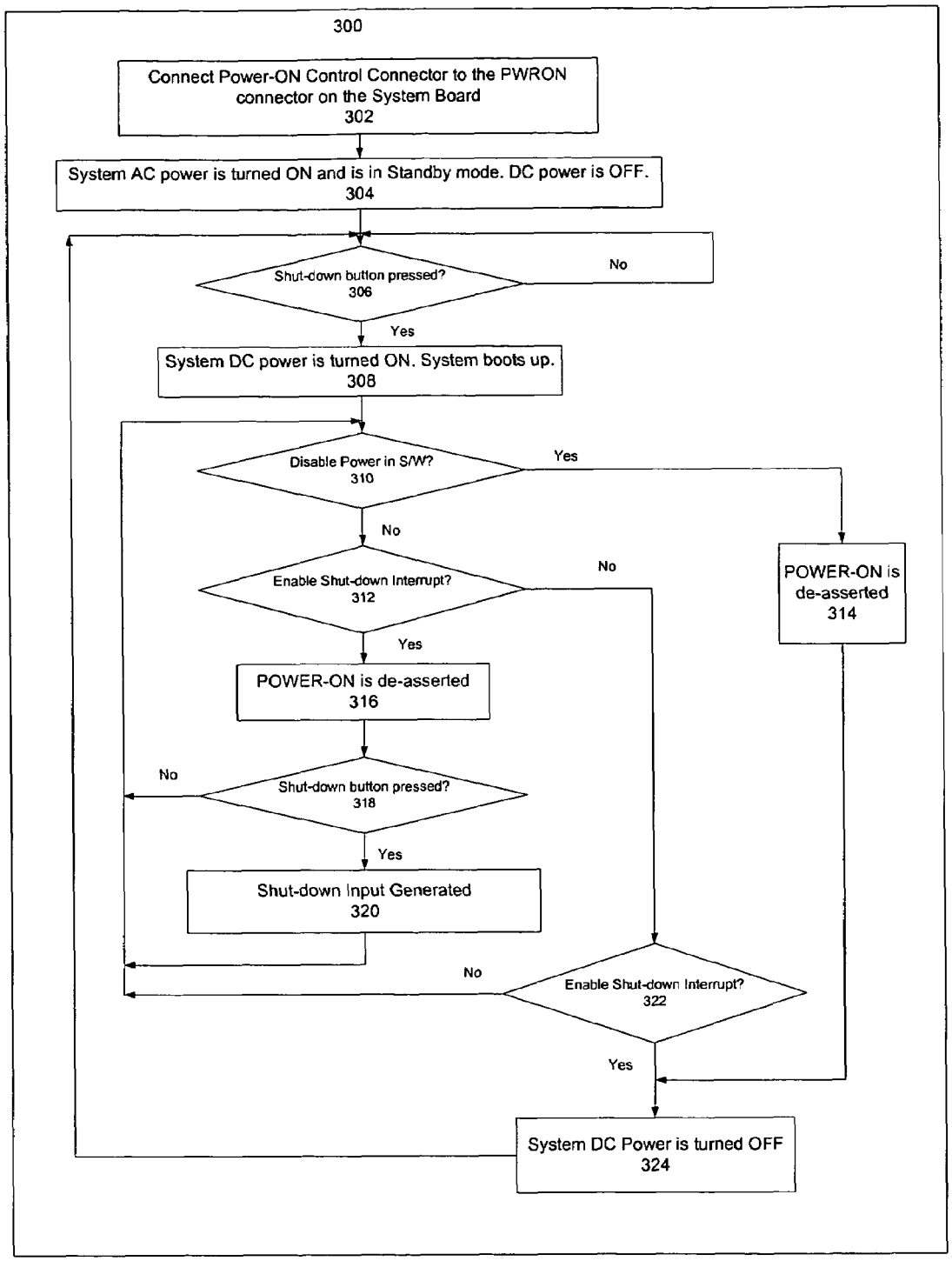
FIG. 11 is a flow chart of one embodiment of a method for using one-button power on control logic as a feature of the USB flash storage in accordance with the present invention for allowing the computing device to be used as a server.

FIG. 11 is a flow chart of one embodiment of a method 300 for using one-button shut down and power-on control logic as a feature of the USB flash storage 100. The method 300 is preferably performed using the power-on control connector 116 and the shut-down connector 114 of FIG. 2. The power control connector (not shown) of the computing device 10 is coupled with a power-on connector 116, via step 302. The AC power to the USB flash storage 100 is then turned on, the DC power to the USB flash storage 100 turned off, and the server of the USB flash storage 100 placed in standby mode, via step 304. It is determined whether the shut-down button has been depressed, via step 306. If not, step 306 is repeated.

Otherwise, DC power for the USB flash storage 100 is turned on and the USB flash storage 100 boots up, via step 308. It is then determined whether power is to be disabled by software, via step 310. If so, then the power on is de-asserted, via step 314 and the system DC power turned off via step 324. If power is not to be disabled by software, then it is determined whether the shut-down interrupt is to be enabled, via step 312. If not, it is determined whether the shut-down button has been pressed, via step 322. If so, then the system DC power is turned off, via step 324. Otherwise, the method returns to step 310. If it is determined in step 312 that the shut-down interrupt is to be enabled, power on is de-asserted, via step 316. It is then determined whether the shut-down button has been pressed, via step 318. Preferably, step 318 determines whether the shut-down button has been pressed for a particular amount of time. If not, then the method returns to step 310. Otherwise, the shutdown input is generated, via step 320 and step 310 is repeated.

Thus, using the method 300, the shut-down button can be used in different ways. If the shut down button is pressed prior to a shut-down interrupt being enabled, then the method 300 allows the DC power to the USB flash storage 100 to be turned off. If, however, the shutdown interrupt was enabled, as determined in step 312, prior to the shut-down button being pressed, then the shut down input generated in step 320 and the USB flash storage 100 can be shut down using the method 220. By using the method 300, the shut-down button can be used either to turn off the DC power to the system or to shut down the USB flash storage 100. By using the methods 220, 240, 260, 280 and 300 of FIGS. 7-11, additional functions can be provided using the USB flash storage 100.

Figure 12:
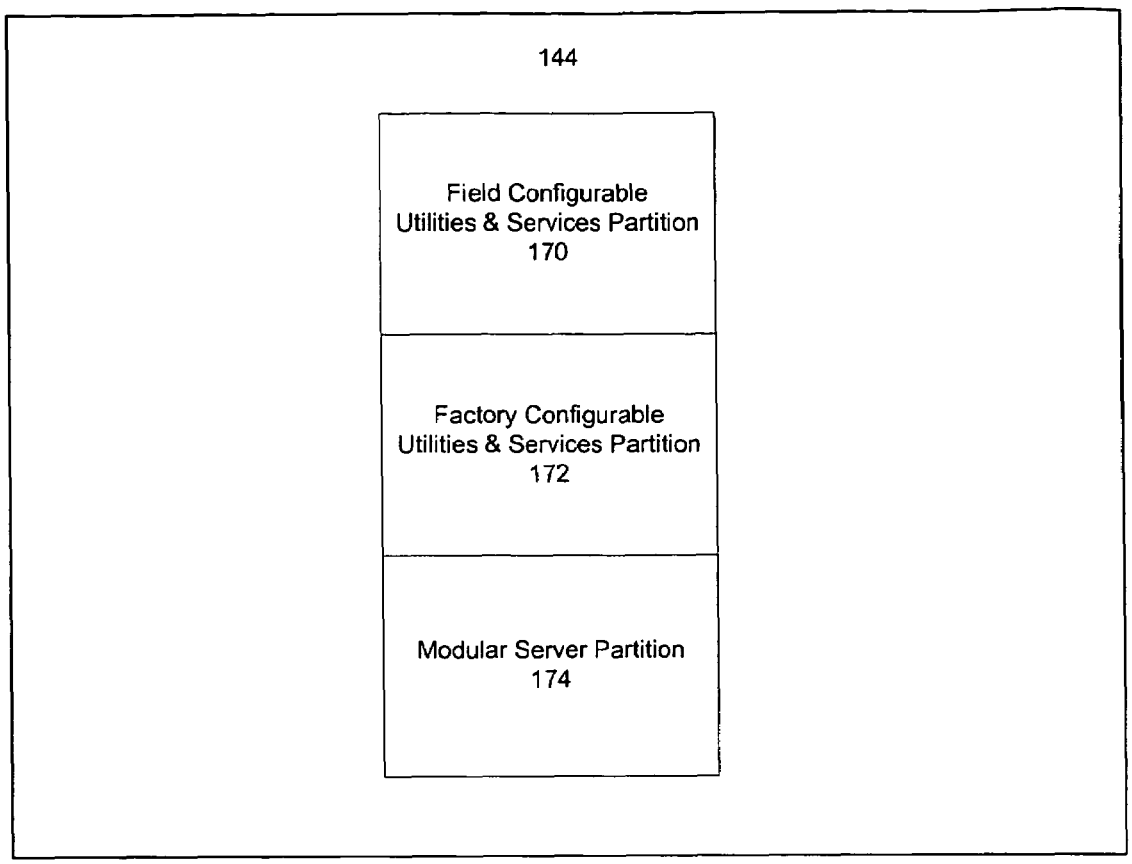
FIG. 12 is a diagram of one embodiment of the image of the partitions stored in the Compressed Server Image in accordance with the present invention for allowing the computing device to be used as a server.

FIG. 12 is a diagram of one embodiment of the image of the partitions stored in the Compressed Server Image 144 of FIG. 4 in accordance with the present invention. The Field Configurable Utilities & Services Partition 170 is a partition that allows users to customize necessary utilities and services in the field. The Factory Configurable Utilities & Services Partition 172 is a partition that allows the manufacturer to customize necessary utilities and services in the factory. Both Field Configurable Utilities & Services Partition 170 and Factory Configurable Utilities & Services Partition 172 include Access Control and Authentication 410. The Modular Server Partition 174 is a partition that stores various server software.

Figure 13:
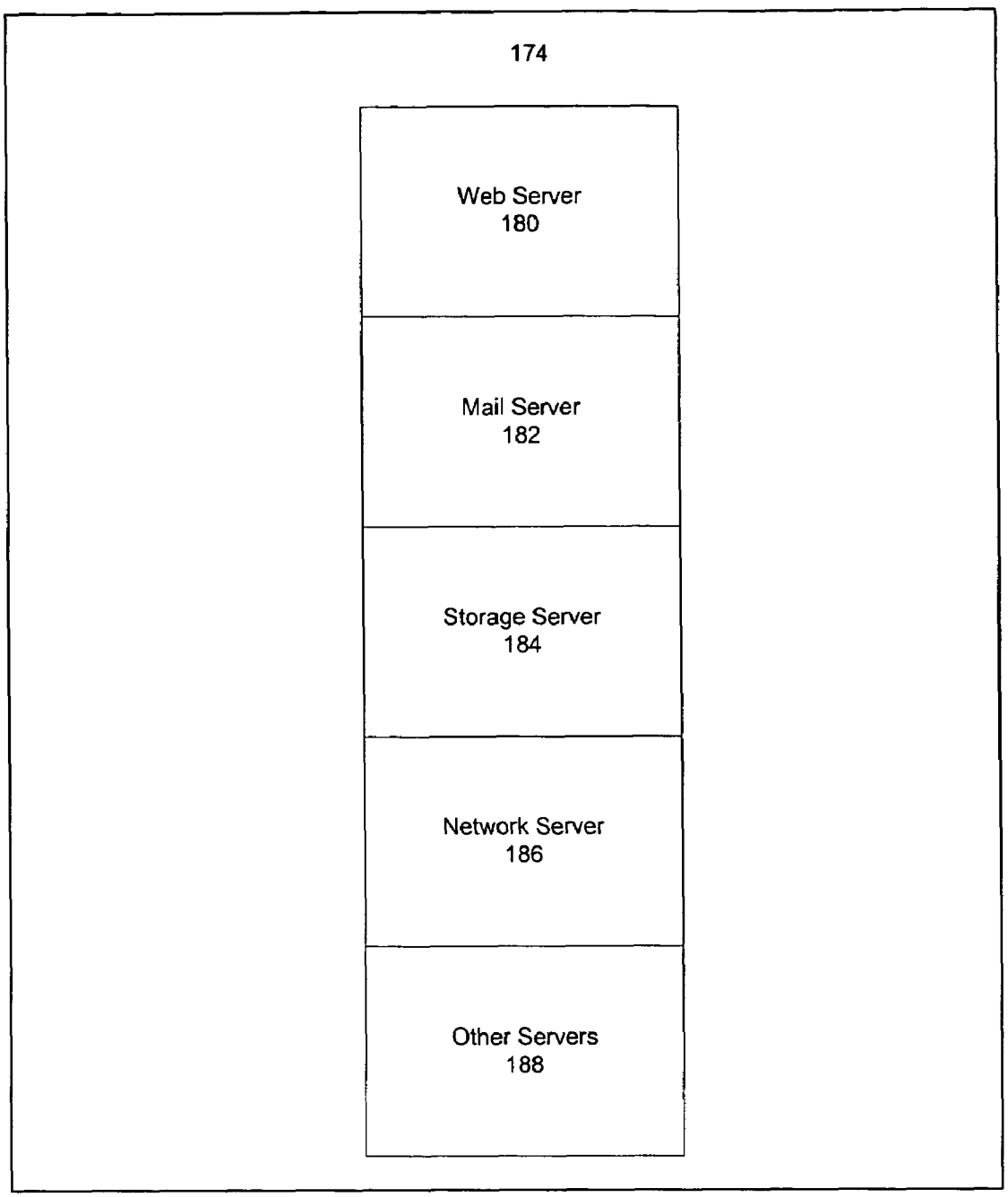
FIG. 13 is a diagram of one embodiment of the image of the servers stored in the Modular Server Partition in accordance with the present invention for allowing the computing device to be used as a server.

FIG. 13 is a diagram of one embodiment of the image of the servers stored in the Modular Server Partition 174 of FIG. 12 in accordance with the present invention. Web Server 180 provides the vehicle for other network computing devices 10 to access the modular server based on the USB Flash Storage 100. The Mail Server 182 provides e-mail service. The Storage Server 184 provides storage service. The Network Server 186 provides network services such as DHCP, DNS and SSL VPN. Other Servers 188 provide other server services including media server.

Figure 14:
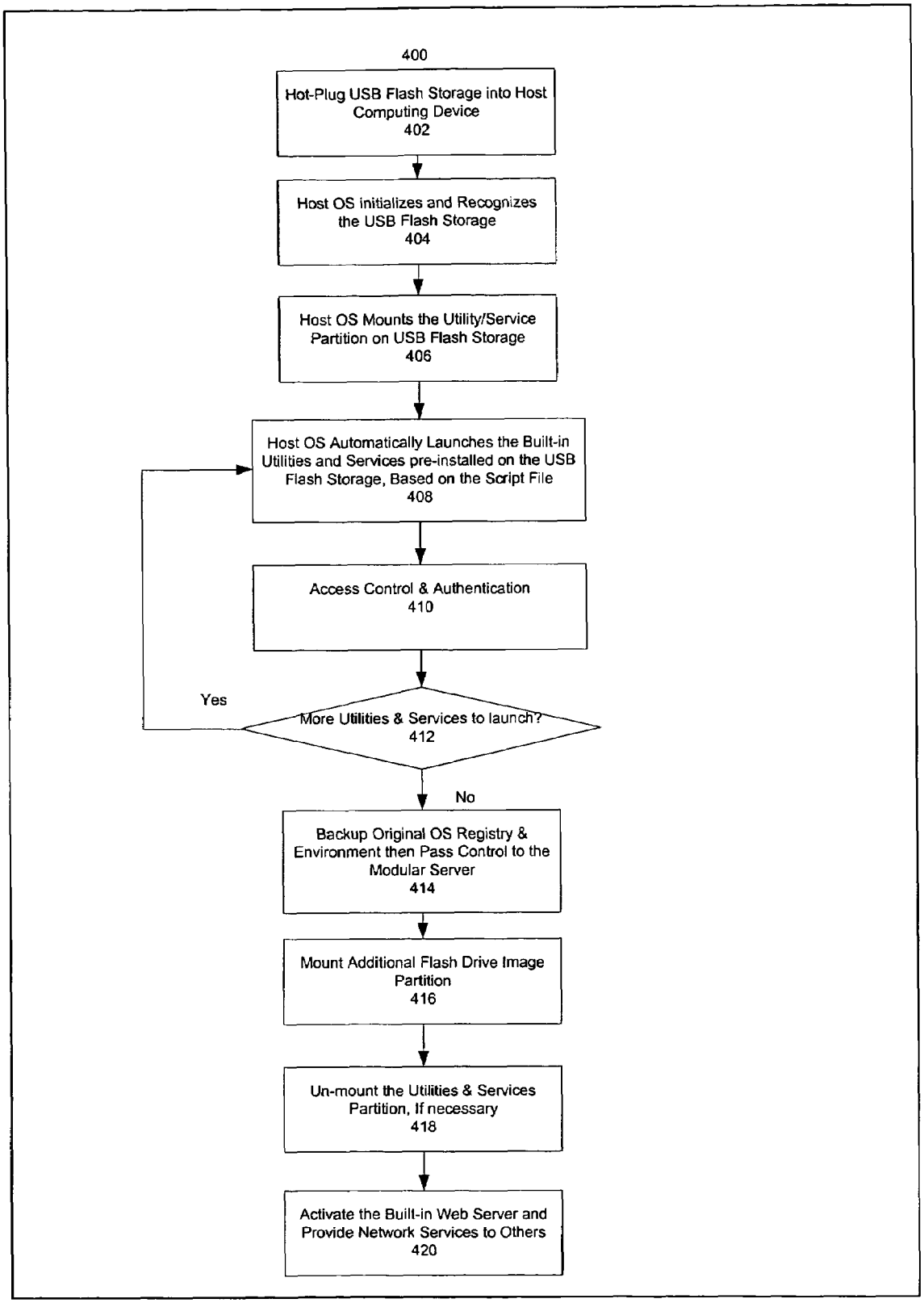
FIG. 14 is a flow chart of one embodiment of a method for hot-plugging the USB flash storage and auto-launching the built-in utilities and services with access control and authentication in accordance with the present invention for allowing the computing device to be used as a server.

FIG. 14 is a flow chart of one embodiment of a method 400 for a hot-plug routine in the host computing device 10 in accordance with the present invention. Due to the hotswap nature of the USB flash storage 100, the computing device 10 can have the USB flash storage 100 plugged in when it is up and running. After it is plugged in, the OS 15 on the computing device 10 initializes and recognizes the USB flash storage 100 at step 404. One of the partitions of the USB flash storage 100 that stores the built-in utilities and services 170 and 172 (of FIG. 12) is mounted accordingly at step 406. The host OS then automatically launches the built-in utilities 170 and 172 and services in sequence during step 408 based on a script file (not shown) stored on the partition. Each service and utility 170 and 172 launched has its own access control and authentication requirement at step 410. The access control and authentication requirement at step 410 can be fulfilled manually or automatically by a separate script file (not shown). As soon as all utilities and services 170 and 172 are launched (during steps 408 and 412), the original OS 15 registry and environment are backed up at step 414. The control is passed during step 414 to the newly configured modular server 174. The flash drive image partition 146 is mounted afterwards at step 416. The utilities & services partition 144 is un-mounted, if no addition reference is required at step 418. For security reason, the partition 144 storing the start-up utilities & services is better suited to be un-mounted during step 418 such that its trace of operation is hidden and the drive letter resource (not shown) is freed as well. A built-in web server 180 (of FIG. 13) is then activated at step 420 to provide a vehicle for any other computing device 10 on the same network to access additional server services (182, 184, 186 and 188) available on the modular server 174. The additional server services include but are not limited to file synchronization 188, environment synchronization 188, storage server 184, mail server 182, media server 188, and network server 186. The modular server 174 on the USB flash storage 100 takes control at this point.

Figure 15:
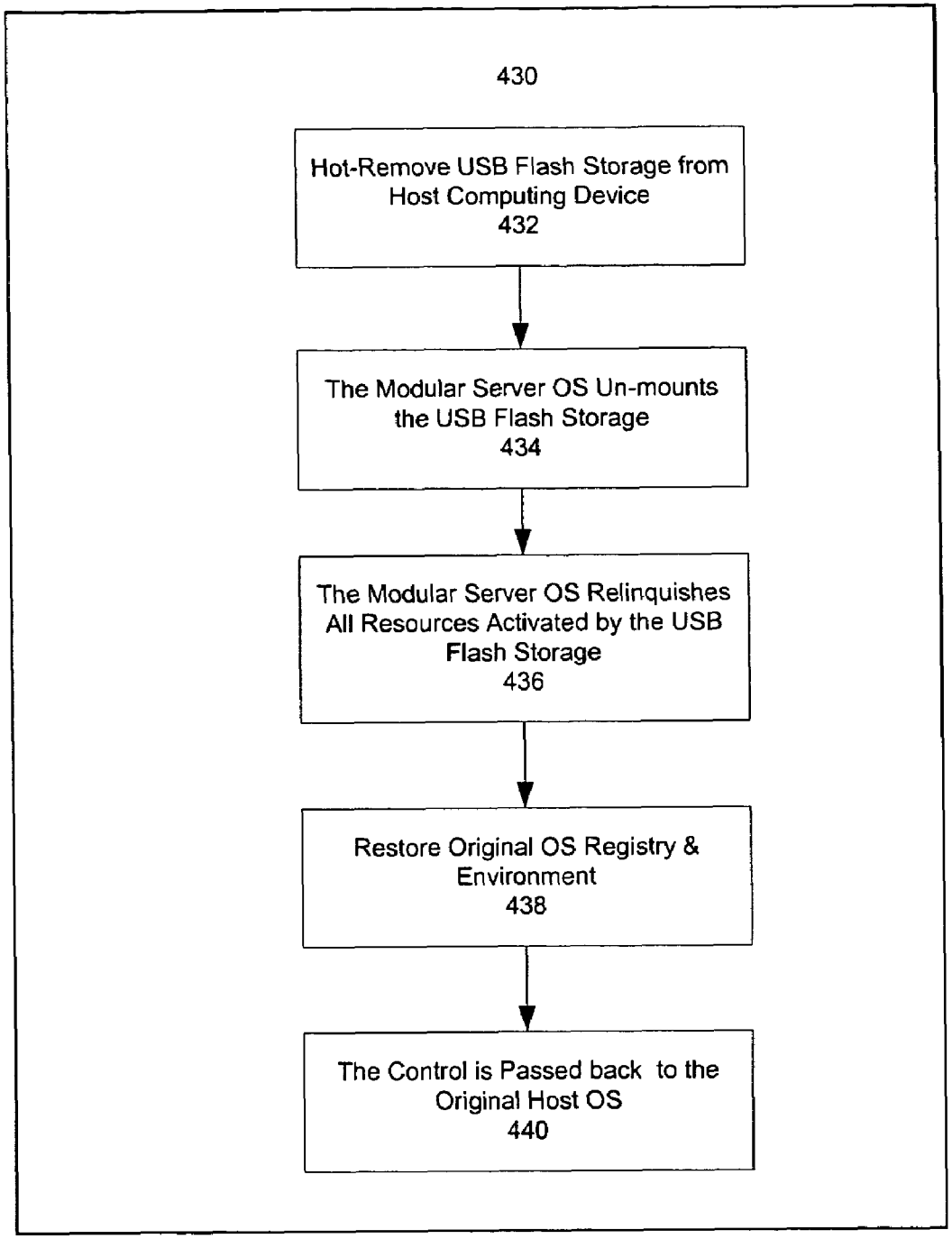
FIG. 15 is a flow chart of one embodiment of a method for hot-removing the USB flash storage and restoring the computing system back to its original state in accordance with the present invention for allowing the computing device to be used as a server.

FIG. 15 is a flow chart of one embodiment of a method 430 for a hot-remove routine in the host computing device 10 in accordance with the present invention. Again, due to the hotswap nature of the USB flash storage 100, the computing device 10 can have the USB flash storage 100 un-plugged when it is up and running. After it is un-plugged at step 432, the modular server OS 174 on the computing device 10 un-mounts at step 434 the USB flash storage 100 from the system. The modular server OS 174 relinquishes at step 436 all resources activated by the USB flash storage 100. It then restores 438 the registry and environment of the original OS 15. The control is then passed back 440 to the original OS 15 of the computing device 10.

A method and system have been disclosed for allowing a computing device to be used as a server. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network.

Accordingly, a system and method in accordance with the present invention applies to a variety of mass storage devices such as Serial ATA FLASH hard drive, IDE FLASH hard drive, SCSI FLASH hard drive and Ethernet FLASH hard drive. In addition, a FLASH controller in accordance with the present invention also applies to FLASH memory cards such as Express Card, Mini PCI Express Card, Secure Digital Card, Multi Media Card, Memory Stick Card and Compact FLASH card. Finally, a FLASH controller in accordance with the present invention also applies to the other serial buses such as PCI Express bus, Serial ATA bus, IEEE 1394 bus and Ethernet bus. Accordingly, many modifications may be made by one of ordinary skill in the art without departing from the spirit and scope of the appended claims.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

I claim:

1. A system for providing a server-on-a-Universal Serial Bus (USB) for a computing device, the system comprising:
    a bus interface logic to interface the computing device with the system, the bus interface logic allowing the computing device to communicate with the system;
    a memory for storing a server image and a USB local control program, said USB local control program enabling the computing device to be used as a server and booting up said server, the server image being provided from said memory to the computing device by means of the USB local control program, the USB local control program providing hot swappable functionality to create different server environments, the server image includes a default field configurable and field upgradeable bitmap image of a first control logic, an active field configurable and field upgradeable bitmap image of the first control logic, the default field configurable and field upgradeable bitmap image and the active field configurable and field upgradeable bitmap image allows the server to track and utilize the firs control logic, a default compressed server image, an active server image, a default flash drive boot-up image, and an active flash boot-up image; and
    the first control logic coupled to the bus interface logic comprising serial bus control logic, Flash memory control, interrupt logic, status and control decode, and display control.

2. The system of claim 1, further comprising:
    an Init connector;
    a shut-down connector;
    a power-on control connector;
    a status light emitting diode connector;
    a direct-current power light emitting diode connector; and
    a light-emitting-diode display connector.

3. The system of claim 1, wherein said memory in which said server image is stored is a flash memory.

4. The system of claim 1, further comprising:
    a second control logic, having an address decode and control for the local control program, a flash memory address decode and control, a liquid crystal display address decode and control, one button shut-down interrupt logic, ID status and control decode and one button Init interrupt logic.

5. The system of claim 4, further comprising a second button, said second control logic also including a logic for shut-down connector coupled to said second button said shut-down connector shutting down said server gracefully if said second button is activated for a particular period of time.

6. The system of claim 4, wherein the second control logic also includes logic for a power-on connector coupled to the computing device, the power-on connector providing power to the computing device provided that said memory is provided with power.

7. The system of claim 4, further comprising a light emitting diode (LED) connector,
    said second control logic also including a logic for a status LED coupled to the LED connector for indicating the operating status of the server.

8. The system of claim 4, further comprising a LED connector,
    said second control logic also including a level detecting logic for a power-on LED coupled to the LED connector for indicating the power status of the server.

9. The system of claim 4, further comprising a liquid crystal display (LCD) connector,
    said second control logic also including a logic for a liquid crystal display coupled to said LCD connector for displaying the operating status of the server.

10. The system of claim 4, wherein said bus interface logic, said second control logic, and said memory in which said server image is stored are all located on the same circuit board.

11. A system for providing a server-on-a-USB for a computing device, said system comprising:
- a bus interface logic by which to interface the system with the computing device so that the computing device communicates with the system;
- a USB local control program coupled to the bus interface logic and a flash memory for storing a server image, said USB local control program enabling the computing device to be used as a server and booting up said server, the server image being provided to the computing device by means of the USB local control program, the USB local control program providing hot swappable functionality to create different server environments, the server image includes a default field configurable and field upgradeable bitmap image of a first control logic, an active field configurable and field upgradeable bitmap image of the first control logic, the default field configurable and field upgradeable bitmap image and the active field configurable and field upgradeable bitmap image allows the server to track and utilize the first control logic, a default compressed server image, an active server image, a default flash drive boot-up image, and an active flash boot-up image; and
- the first control logic coupled to the bus interface logic comprising serial bus control logic, Flash memory control, interrupt logic, status and control decode, and display control.

12. The system of claim 11, further comprising a second control logic and a first push button, said second control logic including a first logic for a one-button init connector coupled to said first push button for restoring said server to a default state in response to said first push button being pressed for a particular period of time.

13. The system of claim 12, further comprising a second push button, said second control logic also including a second logic for a shut-down connector coupled to said second push button, said shut-down connector shutting down said server gracefully provided that said second push button is pressed for a particular period of time.

14. The system of claim 12, wherein said second control logic also includes a third logic for a power-on connector coupled to the computing device, said power-on connector providing power to the computing device provided that said memory is first provided with power.

15. The system of claim 12, further comprising a LED connector,
said second control logic also including a logic for a status LED coupled to said LED connector for indicating the operating status of the server.

16. The system of claim 12, further comprising a LED connector,
said second control logic also including a level detecting logic for a power-on LED coupled to said LED connector for indicating the power status of the server.

17. The system of claim 12, further comprising a LCD connector, said second control logic also including a logic for a liquid crystal display coupled to said LCD connector for displaying the operating status of the server.

18. The system of claim 11, wherein said bus interface logic, said USB local control logic, said flash memory, said plurality of control button connectors, said plurality of LED connectors and said liquid crystal display connector are all located on the same circuit board.

19. A method for providing a server-on-a-USB for a computing device, said method comprising:
- identifying a system having a memory and bus interface logic by which to interface the system with the computing device so that the system and the computing device communicate with one another;
- storing a server image in the memory of the system;
- accessing a USB local control program from said memory, said UBS local control program being coupled to said bus interface logic; and
- using the USB local control program for providing the computing device with the server image from said memory and for booting up said server, the USB local control program providing hot swappable functionality to create different server environments, the server image includes a default field configurable and field upgradeable bitmap image of a first control logic, an active field configurable and field upgradeable bitmap image of the first control logic, the default field configurable and field upgradeable bitmap image allows the server to track and utilize the first control logic, a default compressed server image, an active server image, a default flash drive boot-up image, and an active flash boot-up image; and
- coupling a the first control logic to the bus interface logic comprising serial bus control logic, Flash memory control, interrupt logic, status and control decode, and display control.

20. The method of claim 19, further comprising displaying the operating status and power status of the server.

21. The method of claim 19, further comprising hot-plug connecting the memory in which the server image is stored to the computing device while said computing device is operating.

22. The method of claim 21, further comprising disconnecting said memory from the computing device while said computing device is operating.

23. The method of claim 22, further comprising restoring the registry and environment of the computing device following the disconnection of said memory from said computing device.

24. The method of claim 19, wherein said memory is a USB flash memory.

25. The method of claim 24, further comprising installing utilities and services at a specific location in said USB flash memory, the computing device automatically launching said utilities and services in a particular sequence depending upon a script file stored in said USB flash memory.

26. A system for providing a server-on-a-USB for a computing device, the system comprising:
- a bus interface logic to interface the computing device with the system, the bus interface logic allowing the computing device to communicate with the system;
- a memory for storing a server image and a USB local control program, said USB local control program enabling the computing device to be used as a server and booting up said server, the server image being provided from said memory to the computing device by means of the USB local control program, the USB local control program providing hot swappable functionality to create different server environments, the server image includes a default field configurable and field upgradeable bitmap image of a first control logic, an active field configurable and field upgradeable bitmap image of the first control logic, the default field configurable and field upgradeable bitmap image and the active field configurable and field upgradeable bitmap image allows the server to track and utilize the first control logic, a default compressed server image, an active server image, a default flash drive boot-up image, and an active flash boot-up image;

the first control logic coupled to the bus interface logic comprising serial bus control logic, Flash memory control, interrupt logic, status and control decode, and display control; and a second control logic; and a first button, the second control logic including a logic for a one-button init connector coupled to said first button for restoring said server to a default state in response to said first button being activated for a particular period of time; wherein the second control logic also includes a logic for a power-on connector coupled to the computing device, the power-on connector providing power to the computing device provided that said memory is first provided with power.

27. A system for providing a server-on-a-Universal Serial Bus (USB) for a computing device, the system comprising:

a bus interface logic to interface the computing device with the system, the bus interface logic allowing the computing device to communicate with the system;

a memory for storing a server image and a USB local control program, said USB local control program including a system initialization and testing block, a local control program run-time main program, an LCD display driver, a flash memory driver, a shut-down interrupt service routine, and an init interrupt service routine, said USB local control program enabling the computing device to be used as a server and booting up said server, the USB local control program providing hot swappable functionality to create different server environments, the server image being provided from said memory to the computing device by means of the USB local control program, the server image includes a default field configurable and field upgradeable bitmap image of a first control logic, an active field configurable and field upgradeable bitmap image of the first control logic, the default field configurable and field upgradeable bitmap image and the active field configurable and field upgradeable bitmap image allows the server to track and utilize the first control logic; default compressed server image, an active server image, a default flash drive boot-up image, and an active flash boot-up image; and the first control logic coupled to the bus interface logic comprising serial bus control logic, Flash memory control, interrupt logic, status and control decode, and display control.

28. The system of claim 27, wherein the USB local control program establishes a personalized key to extract the server image from the memory.

* * * * *